L. B. CRITTENDEN.
Coffee Roaster.
No. 88,612.
Patented April 6, 1869.
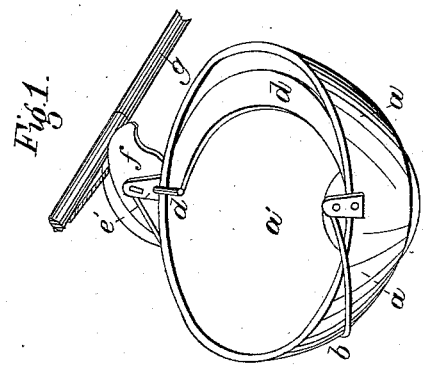
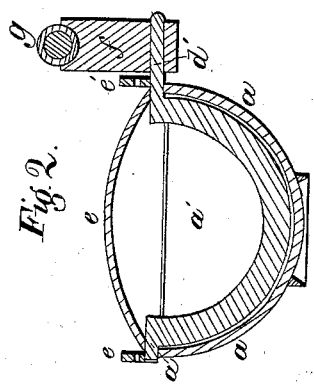
Witnesses:
Thos B Kerr
R C Wrenshall
Inventor:
Lyman B. Crittenden
by Bakewell & Christy
his Attys

LYMAN B. CRITTENDEN, OF PITTSBURG, PENNSYLVANIA.

Letters Patent No. 88,612, dated April 6, 1869.

COFFEE-ROASTER.

The Schedule referred to in these Letters Patent and making part of the same.

*To all whom it may concern:*

Be it known that I, LYMAN B. CRITTENDEN, of Pittsburg, in the county of Allegheny, and State of Pennsylvania, have invented a new and useful Improvement in Coffee-Roasters; and I do hereby declare the following to be a full, clear, and exact description thereof, reference being had to the accompanying drawing, making a part of this specification, in which—

Figure 1 is a perspective view of my improvement, and

Figure 2 is a sectional view thereof, such section being formed by a plane passing vertically through the axis of the stirrer.

Like letters of reference indicate like parts in each.

The nature of my invention consists in the construction of a coffee-roaster, consisting of a semi-hemispherical dish, having a closely-fitting cover and oscillating stirrer, one of the bearings of which is prolonged, and carries a segmental wheel, through which, by suitable devices, the stirrer is operated.

To enable others skilled in the art to make and use my invention, I will proceed to describe its construction and manner of use.

$a$ is a kettle, having a semispherical cavity, $a'$, and is provided with a bail, $b$, and cover, $c$.

The oscillating stirrer $d$ is made of such shape, and so hung by gudgeons $d'$, extending through the ears $e$ $e'$, that its lower edge, as it is operated back and forth, shall sweep the bottom of the cavity $a'$.

One of the gudgeons is prolonged outside of the kettle, and on it is fixed a segmental wheel, $f$, or, in lieu thereof, a crank, or other equivalent device.

To such segmental wheel $f$, or to the crank, or other device, and in any convenient way, I attach one end of a rod, $g$, and taking the other end in the hand, and moving it forward and back, impart to the stirrer $d$ an oscillating motion, by which the coffee in the kettle $a$ is so kept in motion that while being roasted over the fire it will not be burned by being allowed to remain too long in contact with the bottom of the kettle $a$.

The cover $c$ fits so closely as to prevent the escape of the aroma of the coffee.

The stirrer $d$ should be narrow, or otherwise so made that the coffee, while being stirred, may pass from one side of it to the other, and back.

To make the stirring-devices removable, I attach the segmental wheel $f$ to its gudgeon, or axis, in such way that it may be easily taken off. Then one of the ears, $e'$, (or both of them, if so preferred,) being set back a little, or attached on the outside of the kettle $a$, it will have sufficient longitudinal play on its axis to enable the shorter gudgeon to be withdrawn from its bearing in the ear $e$.

The stirrer $d$ can then be taken out, and the kettle $a$, with or without its cover. $c$, be used for the ordinary purposes.

I do not limit myself in my invention to any particular shape for the kettle, or roasting-dish $a$. Any shape may be adopted which will permit of the use therewith of an oscillating stirrer, sweeping the bottom of its cavity.

What I claim as my invention, and desire to secure by Letters Patent, is—

A coffee-roaster, consisting of a dish, or kettle $a$, close-fitting cover $e$, and oscillating stirrer $d$, one of the bearings, $d'$, of which is prolonged, so as to carry a segmental wheel, $f$, through which, by means of a rod, $g$, or equivalent devices, the stirrer is operated, the whole being constructed substantially as and for the purposes hereinbefore set forth.

In testimony whereof, I, the said LYMAN B. CRITTENDEN, have hereunto set my hand.

LYMAN B. CRITTENDEN.

Witnesses:
ELL TORRANCE,
G. H. CHRISTY.